(12) United States Patent
Bonde et al.

(10) Patent No.: US 12,306,283 B2
(45) Date of Patent: May 20, 2025

(54) AUDIO-BASED METHOD FOR DETERMINING DEVICE DISTANCE

(71) Applicant: Bose Corporation, Framingham, MA (US)

(72) Inventors: Casper Stork Bonde, Støvring (DK); Rasmus Abildgren, Skørping (DK)

(73) Assignee: Bose Corporation, Framingham, MA (US)

( * ) Notice: Subject to any disclaimer, the term of this patent is extended or adjusted under 35 U.S.C. 154(b) by 475 days.

(21) Appl. No.: 17/337,908

(22) Filed: Jun. 3, 2021

(65) Prior Publication Data

US 2022/0390580 A1    Dec. 8, 2022

(51) Int. Cl.
| | |
|---|---|
| *G01S 11/14* | (2006.01) |
| *G10L 25/51* | (2013.01) |
| *H04R 1/08* | (2006.01) |
| *H04R 3/00* | (2006.01) |
| *H04W 4/80* | (2018.01) |
| *H04W 76/10* | (2018.01) |

(52) U.S. Cl.
CPC .............. *G01S 11/14* (2013.01); *G10L 25/51* (2013.01); *H04R 1/08* (2013.01); *H04R 3/00* (2013.01); *H04W 4/80* (2018.02); *H04R 2420/07* (2013.01); *H04W 76/10* (2018.02)

(58) Field of Classification Search
CPC ......... G01S 11/14; H04W 4/80; H04W 76/10; G10L 25/51; H04R 1/08; H04R 3/00; H04R 2420/07
See application file for complete search history.

(56) References Cited

U.S. PATENT DOCUMENTS

| | | | |
|---|---|---|---|
| 9,762,195 B1* | 9/2017 | Tao | G01S 15/06 |
| 2009/0054009 A1* | 2/2009 | Yang | H04W 16/14 |
| | | | 455/78 |
| 2017/0094437 A1* | 3/2017 | Kadri | H04R 5/02 |
| 2018/0277123 A1* | 9/2018 | Boesen | H04R 1/1041 |
| 2019/0011545 A1* | 1/2019 | Sundaresan | G01S 5/18 |
| 2020/0029160 A1* | 1/2020 | El-Hoiydi | H04R 25/604 |
| 2021/0216274 A1* | 7/2021 | Huang | G06F 3/165 |

* cited by examiner

*Primary Examiner* — Isam A Alsomiri
*Assistant Examiner* — Abdallah Abulaban
(74) *Attorney, Agent, or Firm* — Bond, Schoeneck & King, PLLC

(57) ABSTRACT

Systems and methods directed to determining the distance between two devices are disclosed. The systems and methods utilize a Bluetooth connection between a first device, such as a smartphone with an acoustic transducer, and a second device, such as an earbud with an embedded microphone, and the audio capturing capabilities of the second device to determine a distance between the two devices. The first device plays audio via the acoustic transducer. This audio is captured by a microphone of the second device. The second device transmits data including the captured audio back to the first device via the Bluetooth connection. The first device calculates a time delay from the playing of the audio to the reception of the data over the Bluetooth connection. The first device then calculates the distance based on the time delay, the latency constant, and the speed of sound.

20 Claims, 9 Drawing Sheets

AUDIO-BASED METHOD FOR DETERMINING DEVICE DISTANCE

BACKGROUND

Aspects and implementations of the present disclosure are generally directed to audio and Bluetooth-based systems and methods for determining device distance and/or locating devices.

Wireless audio-enabled apparatuses, such as earbuds and hearing aids, are becoming increasingly common. These apparatuses often utilize a Bluetooth connection to communicate with an audio source device, such as a smartphone. Further, these apparatuses often include microphones to capture environmental sound for the purpose of hearing assistance, noise cancellation, and more. While these wireless apparatuses provide many advantages in terms of convenience, the increasingly smaller size of such apparatuses also increases the likelihood the user will lose or misplace the apparatus, and have significant difficulty locating it. Accordingly, there is a need for methods and systems for locating wireless audio-enabled apparatuses.

SUMMARY

The present disclosure provides systems and methods for determining device distance and/or locating an audio apparatus utilizing the characteristics of audio and Bluetooth transmission. The systems utilize the audio capturing capabilities of audio apparatuses with embedded microphones, and the Bluetooth connection between the audio apparatus and a locating device, such as a smartphone, to determine a distance between the locating device and the audio apparatus. In particular, the system relies on the known latency constant of a Bluetooth Low Energy Audio (LE Audio) Connected Isochronous Stream (CIS) connection (which can be designed to approximately +/−2 μs) and speed of sound (approximately 343 m/s) to calculate the distance. Additional audio can be played and captured to determine additional location characteristics, such as an angle or direction of the audio apparatus relative to the locating device.

In some examples, the locating device plays audio, such as a tone, song, or white noise, via an acoustic transducer. This audio is captured by the microphone of the audio apparatus. The audio apparatus then transmits the captured audio back to the locating device as data via the Bluetooth connection. The locating device calculates a time delay from the transmission of the audio to the reception of the data via the Bluetooth connection. The locating device then calculates the distance by subtracting the known latency constant from the time delay, and multiplying the result by the speed of sound. In other examples, the audio apparatus can perform a similar calculation based on its reception of both the audio and the data including the audio over the Bluetooth connection. The calculated distance can be displayed to the user via the interface, or conveyed to the user via other means. Accordingly, as the user moves around, iterative distance calculations can be made to determine if the user is moving closer to or farther from the audio apparatus.

In some examples, the audio played by the locating device can be distributed over the full audio frequency band such that it sounds like low volume white noise, rather than high volume single tones or pre-recorded audio tracks. In other examples, the audio could be sonar-like, low frequency audio. In further examples, the system can also determine the direction of the audio apparatus. The direction of the apparatus can be determined by taking multiple distance measurements, as well as by incorporating motion data collected by micro-electromechanical sensors (MEMS) or Global Positioning System (GPS) sensors of the locating device.

In some examples, the system can account for a relative constant delay of the audio system of the locating device. The system can perform an initial, one-time calibration to reduce or eliminate this delay. Additional factors which can impact the accuracy of the distance calculation include Bluetooth interference, air temperature, and humidity. Each millisecond of jitter caused by these factors will correspond to an inaccuracy of approximately 34 cm.

In some examples, the Bluetooth connection can be a legacy Bluetooth connection, such as Bluetooth Classic or Bluetooth LE Asynchronous Connection-Less (ACL). While legacy Bluetooth does not provide the same known latency as LE Audio, it can still be used to implement a less precise version of the distance calculation. By using Synchronous Connection Oriented (SCO) links, Logical Link Control and Adaptation Protocols (L2CAP), LE Connection oriented Channel (CoC), or Generic Attribute (GATT) Profile notifications, the latency jitter can be designed to be within 20 ms. Different methods can be applied to compensate for this significant jitter. For example, detection of the earliest received packet relative to the stream content can be used to fix the stream in time, and an estimated (or calibrated) constant delay can be used. These methods can be used to determine if the locating device is moving away from or closer to the audio apparatus, as well as the distance moved.

Generally, in one aspect, a method for determining a distance between two devices is provided. The method includes playing audio at a first device.

The method further includes recording, via a microphone of a second device, the audio played by the first device.

The method further includes determining a time delay based on the audio played at the first device and the audio recorded via the microphone of the second device.

The method further includes determining a distance between the first device and the second device based on the time delay and a latency of a Bluetooth connection between the first device and the second device. According to an example, the distance is determined by the first device. In an alternative example, the distance is determined by the second device.

According to an example, the method further includes, subsequent to recording the audio played by the first device via the microphone of the second device, sending the audio recorded by the microphone of the second device to the first device via the Bluetooth connection.

According to an example, the method further includes, prior to playing the audio at the first device, receiving, at the first device via the Bluetooth connection, data comprising the audio.

According to an example, the method further includes receiving, at the second device via the Bluetooth connection, data comprising the audio. The Bluetooth connection can be a Broadcast Isochronous Stream.

According to an example, the method further includes subsequent to the microphone of the second device recording the audio, transmitting timing information to the first device. The timing information relates to a reception time of the microphone recording the audio. In this example, determining the time delay is further based on the timing information.

According to an example, the Bluetooth connection uses an isochronous stream. In a further example, the latency of the Bluetooth connection is a known latency associated with Bluetooth Low Energy Audio (LE Audio). According to a further example, the Bluetooth connection is a Bluetooth Classic Connection.

According to an example, determining the distance between the first device and the second device comprises multiplying the difference of the time delay and the latency of the Bluetooth connection by the speed of sound.

According to an example, the audio is played at ultrasonic frequencies.

According to an example, the method further includes determining a location of the first device based on the distance between the first and second devices. In one example, determining the location of the first device further includes (1) moving the first device relative to the second device and (2) determining a second distance between the first and second devices. In an alternate example, determining the location of the first device further includes (1) moving the second device relative to the first device and (2) determining a second distance between the first and second devices. Determining the location of the first device is further based on the second distance.

According to an example, the method further includes determining a location of the second device based on the distance between the first and second devices. In one example determining the location of the first device further includes (1) moving the first device relative to the second device and (2) determining a second distance between the first and second devices. In an alternate example, determining the location of the first device further includes (1) moving the second device relative to the first device and (2) determining a second distance between the first and second devices. Determining the location of the first device is further based on the second distance.

Generally, in another aspect, a system for determining a distance between two devices is disclosed. The system includes a first device. The first device is configured to play audio. According to an example, the first device includes a processor.

The system further includes a second device. The second device includes a microphone The microphone is configured to record the audio played at the first device. According to an example, the second device includes a processor.

The system further includes a processor. The processor is configured to determine a time delay. The time delay is determined based on the audio played at the first device and the audio recorded via the microphone of the second device. The processor is further configured to determine a distance between the first device and the second device. The distance is determined based on the time delay and a latency of a Bluetooth connection between the first device and the second device.

According to an example, the Bluetooth connection uses an isochronous stream. The latency of the Bluetooth connection can be a known latency associated with Bluetooth Low Energy Audio (LE Audio).

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

The present disclosure provides systems and methods for determining device distance and/or locating an audio apparatus utilizing the characteristics of audio and Bluetooth transmission. The systems utilize the audio capturing capabilities of audio apparatuses with embedded microphones, and the Bluetooth connection between the audio apparatus and a locating device, such as a smartphone, to determine a distance between the locating device and the audio device. In particular, the system relies on the known latency constant of a Bluetooth LE-Audio Connected Isochronous Stream (CIS) connection (which can be designed to approximately +/−2 μs) and speed of sound (approximately 343 m/s) to calculate the distance. Additional audio can be played and captured to determine additional location characteristics, such as an angle or direction of the audio apparatus relative to the locating device. In some examples, the locating device plays audio, such as a tone, song, or white noise, via an acoustic transducer. This audio is captured by the microphone of the audio apparatus. The audio apparatus then transmits the captured audio back to the locating device as data via the Bluetooth connection. The locating device calculates a time delay from the transmission of the audio to the reception of the data including the audio over the Bluetooth connection. The locating device then calculates the distance by subtracting the known latency constant from the time delay, and multiplying the result by the speed of sound. In other examples, the audio apparatus can perform a similar calculation based on its reception of both the audio and the data including the audio via the Bluetooth. The calculated distance can be displayed to the user via the interface, or conveyed to user via other means. Accordingly, as the user moves around, iterative distance calculations can be made to determine if the user is closer to or farther from the audio apparatus.

Figure 1:
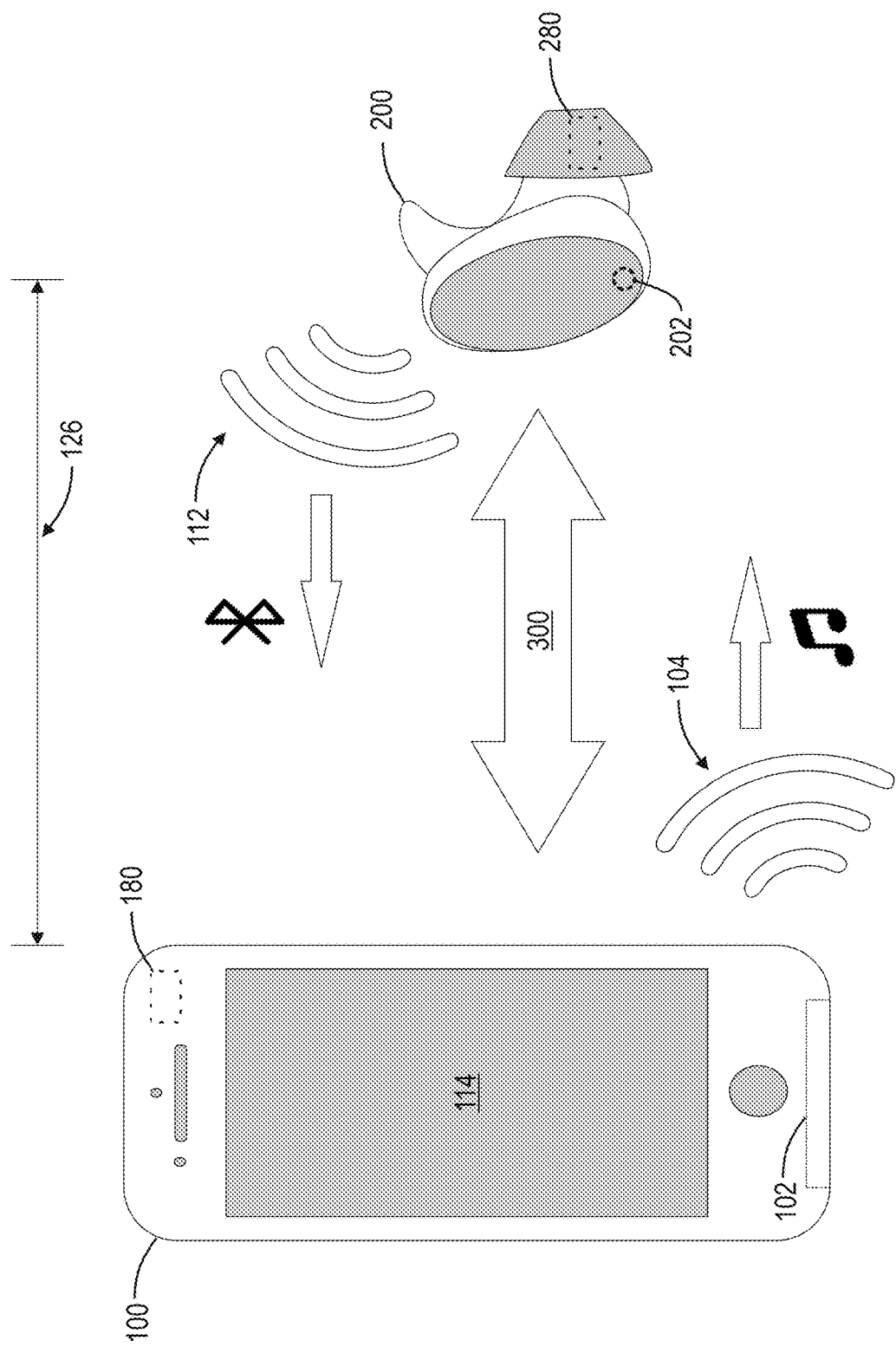
FIG. 1 is a first audio and data transmission diagram of a locating device and an audio apparatus, according to an example.
Figure 5:
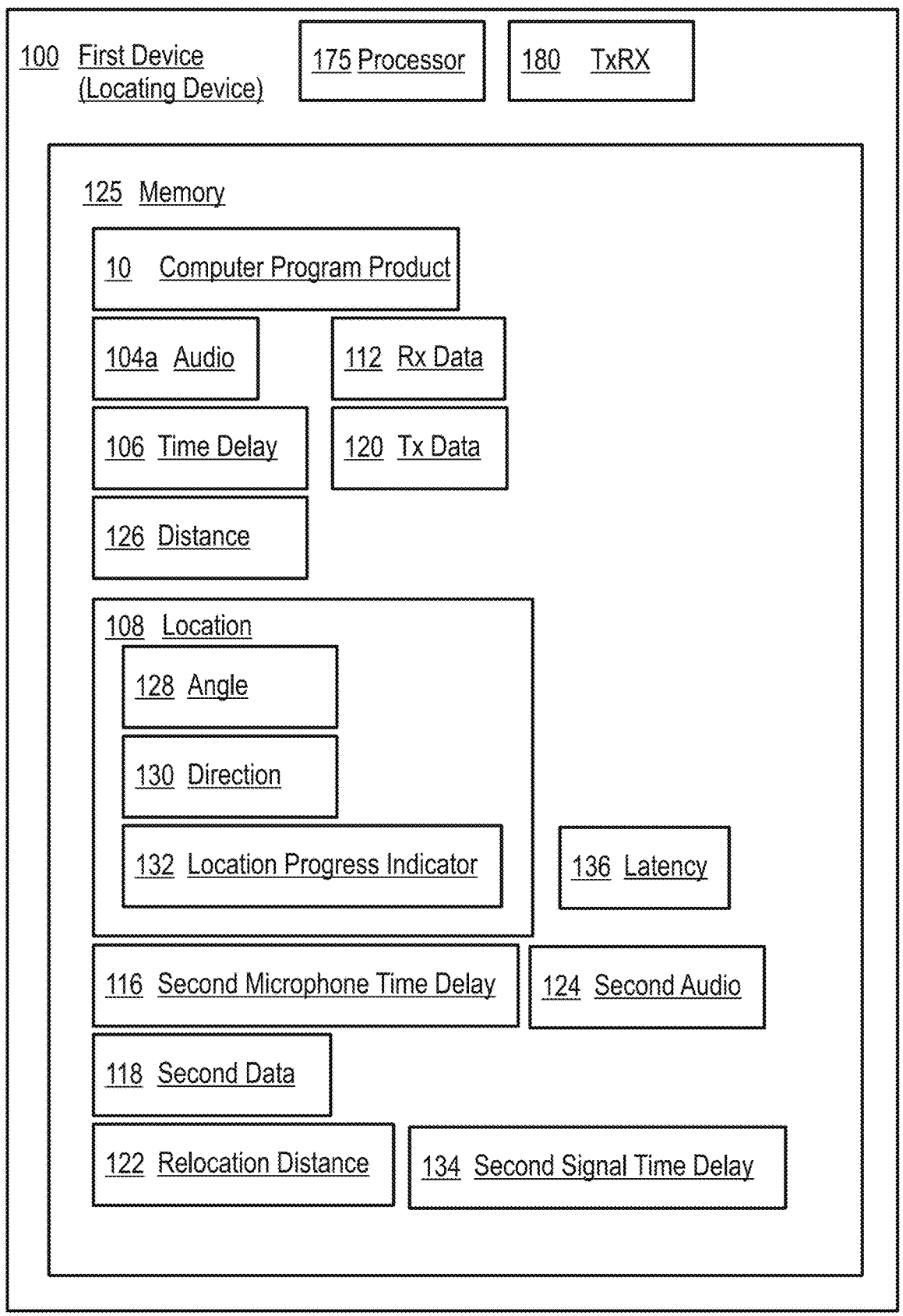
FIG. 5 is a schematic diagram of a locating device, according to an example.

FIG. 1 shows an example of the aforementioned system in which a computer program product 10 installed on first device 100 (in this example, a smartphone) determines the distance 126 to an audio apparatus (in this example, an earbud). In this example, the first device 100 serves as the "locating device" to determine the distance to second device 200, the "audio apparatus." As shown in FIG. 5, the computer program product 10 includes a set of non-transitory computer readable instructions stored on a memory 125 and executable by a processor 175. The set of non-transitory computer readable instructions are arranged to establish a Bluetooth connection 300 between the locating device 100 and the audio apparatus 200. The Bluetooth connection 300 can be formed via transceiver 180 of the locating device 100 and transceiver 280 of the audio apparatus 200. The transceivers 180, 280 can be Bluetooth transceivers, configured to transmit and receive within the Bluetooth frequency band of 2.402 GHz to 2.480 GHz.

According to an example, the Bluetooth connection 300 is an LE Audio connection, such as an LE-Audio CIS stream. Using an LE Audio CIS stream is particularly advantageous in distance determining calculations due to its known latency constant 136 of approximately +/−2 μs. This low known latency constant 136 limits distance calculation errors to +/−0.07 cm.

Alternatively, the LE Audio connection can be an LE Audio Broadcast Isochronous Stream (BIS). Like CIS, BIS also has a known latency constant 136. While CIS enables a point-to-point stream of data between two devices (such as first device 100 and second device 200), BIS enables an infinite number of receivers to receive data from a single transmitting source.

As shown in FIG. 1, the locating device 100 can be a smartphone. In further examples, the locating device 100 can be any controllable device capable of generating sound, such as a tablet computer, personal computer, or smartwatch. The audio apparatus 200 can be an earbud, hearing aid, audio headset, smart speaker, set of audio eyeglasses, soundbar, professional quality loudspeaker, or any other audio device with a microphone 202.

The computer readable instructions are further arranged to play, via an audio transducer 102 of the locating device 100, audio 104 capable of being captured by the microphone 202. In a preferred example, the audio transducer 102 is embedded within or arranged on the locating device 100. FIG. 1 shows an audio transducer 102, such as a speaker, arranged along the bottom edge of the locating device 100.

The audio 104 generated by audio transducer 102 can be any type of audio 104 capable of being detected by a microphone 202. For example, the audio 104 can be a tone or a song. In other examples, the audio 104 can be distributed over the full audio frequency band such that it sounds like low volume white noise. In other examples, the audio 104 can be a sonar-like, low frequency sound. In an even further example, the audio 104 can be played at ultrasonic frequencies. Ultrasonic frequencies are above the frequency limit of human hearing, and are typically defined as being greater than 20 kHz. For clarity, audio 104a refers to the audio upon generation by the audio transducer 102 of the locating device 100, and audio 104b refers to the audio upon capture by the microphone 202 of the audio apparatus 200.

The audio apparatus 200 to be located includes a microphone 202. The audio apparatus 200 can utilize the microphone 202 to capture environmental sound for the purposes hearing assistance, noise cancellation, and more. For example, if the audio apparatus 200 is a hearing aid, the audio captured by the microphone 202 can be amplified by the hearing aid. Conversely, if the audio apparatus 200 is an earbud (as shown in FIG. 1), the audio captured by the microphone 202 can be cancelled out of the audio conveyed to the user through a noise cancellation circuit.

In the present example, while the microphone 202 can be configured to capture audio for a number of different purposes, the microphone 202 must be capable of capturing the audio 104a played by the locating device 100.

Once the microphone 202 captures the audio 104b, the audio apparatus 200 generates data 112 including the audio 104b. The audio apparatus 200 then transmits the data 112 to the locating device 100 via the Bluetooth connection 300.

The computer readable instructions are further arranged to receive, at the locating device 100, via the Bluetooth connection 300, the data 112. The computer readable instructions are further arranged to determine a time delay 106. The time delay 106 is the period of time from the initial playing of the audio 104a by the locating device 100 to the subsequent reception of the data 112 by the locating device 100 via the Bluetooth connection 300. The time delay 106 includes the latency 136 for Bluetooth recording, processing, and transportation.

The computer readable instructions are further arranged to determine a distance 126 between the locating device 100 and the audio apparatus 200. In further examples, other types of information related to location 108 can be determined, such as an angle 128 or a direction 130 relative to the locating device 100. In some examples, a location progress indicator 132 can be determined. The location progress indicator 132 conveys to the user if the locating device 100 is moving closer to or farther from the audio apparatus 200.

The distance 126 between the devices 100, 200 is determined based on the time delay 106 and the latency 136 of the Bluetooth connection 300. In this example, the distance 126 between the audio apparatus 200 and the location device 100 is calculated by subtracting the known latency constant 136 from the time delay 106, and multiplying the resulting difference by the speed of sound (343 m/s). For example, if the time delay 106 is determined to be 15 ms, the audio apparatus 200 is approximately 5 meters from the locating device 100.

The calculated distance 126, along with other information related to location 108 can be displayed via an interface 114.

The interface 114 can display alphanumeric characters corresponding to the location 108, as well as a graphical display, such as a map.

In other examples, the distance 126 and other information related to location 108 can be conveyed to the user via the audio transducer 102, such as by an audio reading of the location information 108, or a sonar-like sound indicating the distance 126 and/or whether the distance 126 is increasing or decreasing over time.

In some examples, the computer readable instructions can account for a relative constant delay of the audio system of the locating device 100. In this example, the locating device 100 can perform an initial, one-time calibration to reduce or eliminate this delay. Additional factors which can impact the accuracy of the distance 126 calculation include Bluetooth interference in non-LE Audio transport types, air temperature, and humidity. Each millisecond of jitter caused by these factors will correspond to inaccuracy of approximately 34 cm.

In a further example, the data 112 including the audio 104b can be received by the first device 100 via the Bluetooth connection 300 prior to the first device 100 playing audio 104a. In this example, when the microphone 202 of the second device 200 captures the audio 104b played by the first device 100, the second device 200 can then determine the time delay 106 and the distance 126 between the devices.

Figure 2:
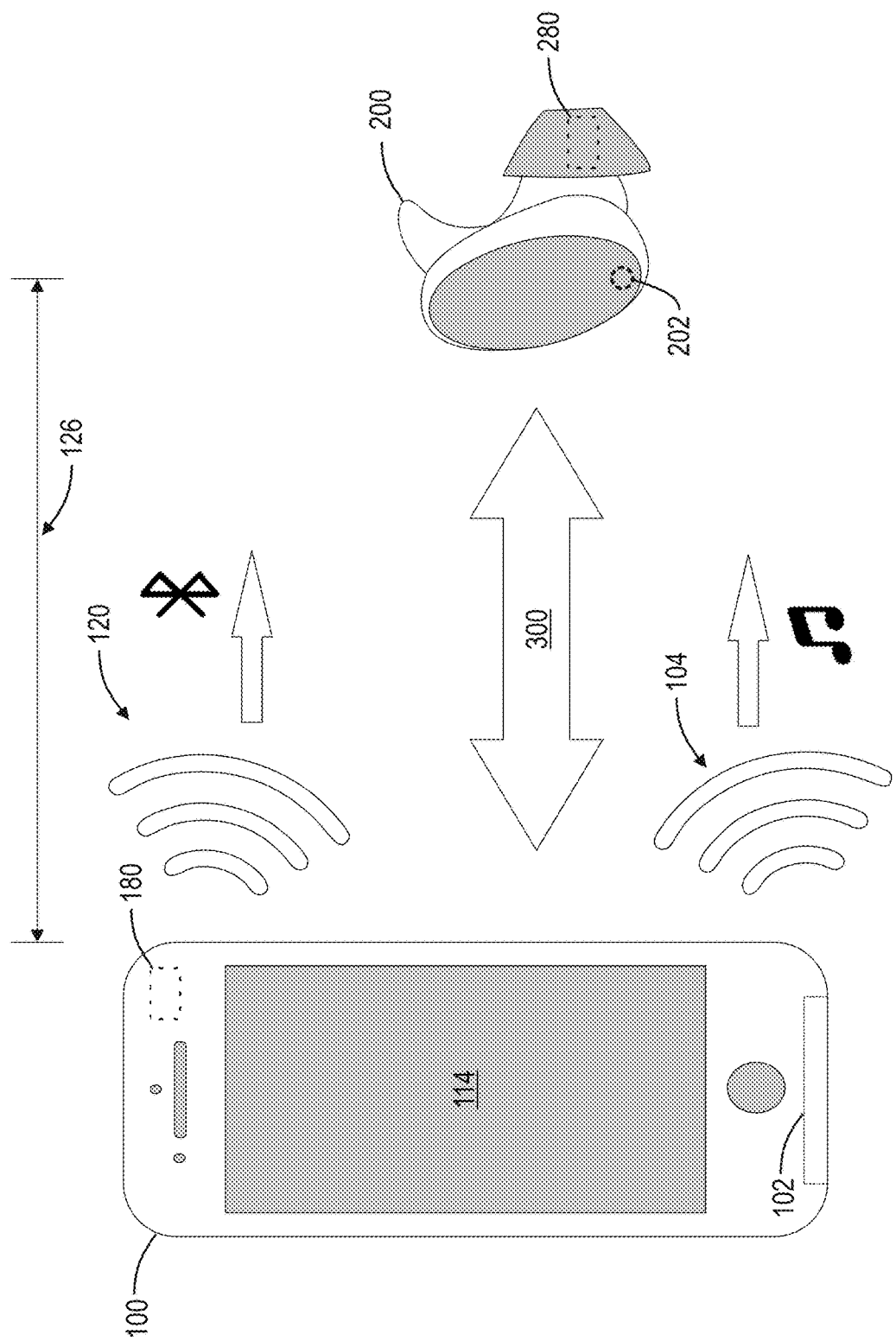
FIG. 2 is a second audio and data transmission diagram of a locating device and an audio apparatus, according to an example.
Figure 6:
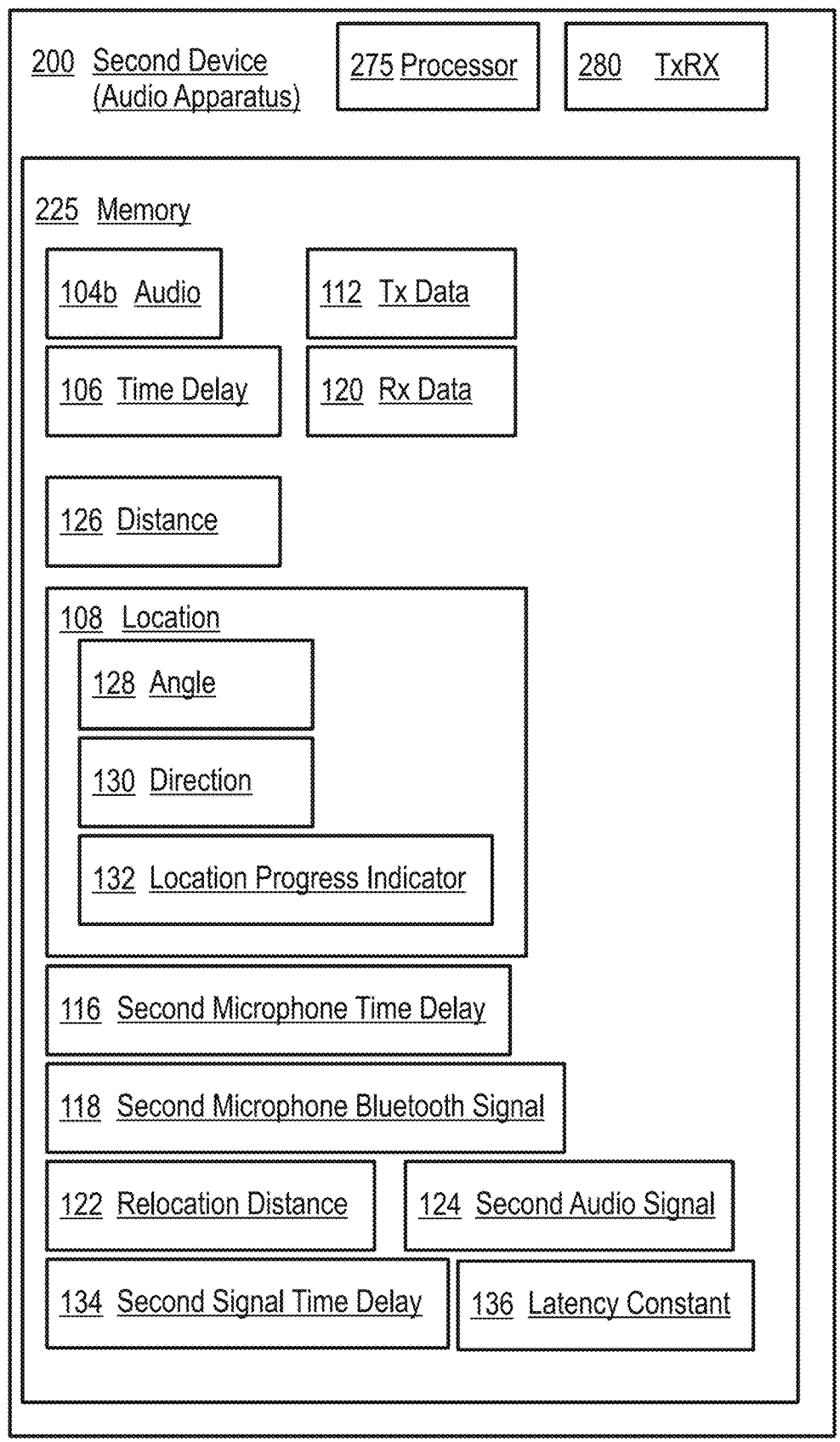
FIG. 6 is a schematic diagram of an audio apparatus, according to an example.

In a further example, and as shown in FIG. 2, the determination of the distance 126 can be performed by the processor 275 of the audio apparatus 200 based on recording audio 104b via microphone 202 and receiving data 120 including the audio 104a over the Bluetooth connection 300. An audio apparatus 200 configured to perform these calculations and determinations is shown in FIG. 6. The audio apparatus 200 can then convey the distance 126 to the locating device 100 via Bluetooth connection 300 for display in the interface 114. Depending on the application, the locating device 100 can play audio 104 before, after, or simultaneously with the transmission of the data 120 over the Bluetooth connection 300.

In the example of FIG. 2, locating device 100 plays the audio 104a while simultaneously transmitting the data 120 including the audio 104a to the audio apparatus 200. Based on the LE Audio latency 136, the processor 275 can calculate when the locating device 100 (1) transmitted the data 120 and (2) played the audio 104a. The processor 275 can then determine the distance 126 between the locating device 100 and the audio apparatus 200 based on when the audio 104a was played by the locating device 100, when the audio 104b was recorded by the audio apparatus 200, and the speed of sound constant.

In further examples, the audio 104a is not played simultaneously with the transmission of the data 120 via the Bluetooth connection 300. Rather the audio 104a is played at some offset time before or after the transmission of the data 120. Information related to this offset time can be conveyed to the audio apparatus 200 over the Bluetooth connection 300. The processor 275 of the audio apparatus 200 can use this information related to the offset time and the LE Audio latency 136 to calculate when the locating device 100 transmitted the data 120, when the locating device played the audio 104a, and the distance 126 between the locating device 100 and the audio apparatus 200.

Further, this arrangement allows for the locating device 100 to transmit data 120 including the audio 104a to an unlimited number of audio apparatuses 200 via an LE Audio BIS. These audio apparatuses 200 can also capture audio 104b via their microphones 202, thereby enabling each audio apparatus 200 to determine their distance 126 from the locating device 100. The audio apparatuses 200 can then transmit their distance 126 to the locating device 100, allowing the locating device 100 to simultaneously determine the distance 126 to an unlimited number of audio apparatuses 200. One application of this arrangement could be to determine the distance 126 from the locating device 100 to two or more speakers in a stereo sound system (or other multi-channel sound system). By determining the distance 126 of each speaker from the locating device 100, the locating device 100 could also triangulate the locations of each speaker. This triangulation could be particularly advantageous when arranging the speakers for optimum sound performance.

Figure 3:
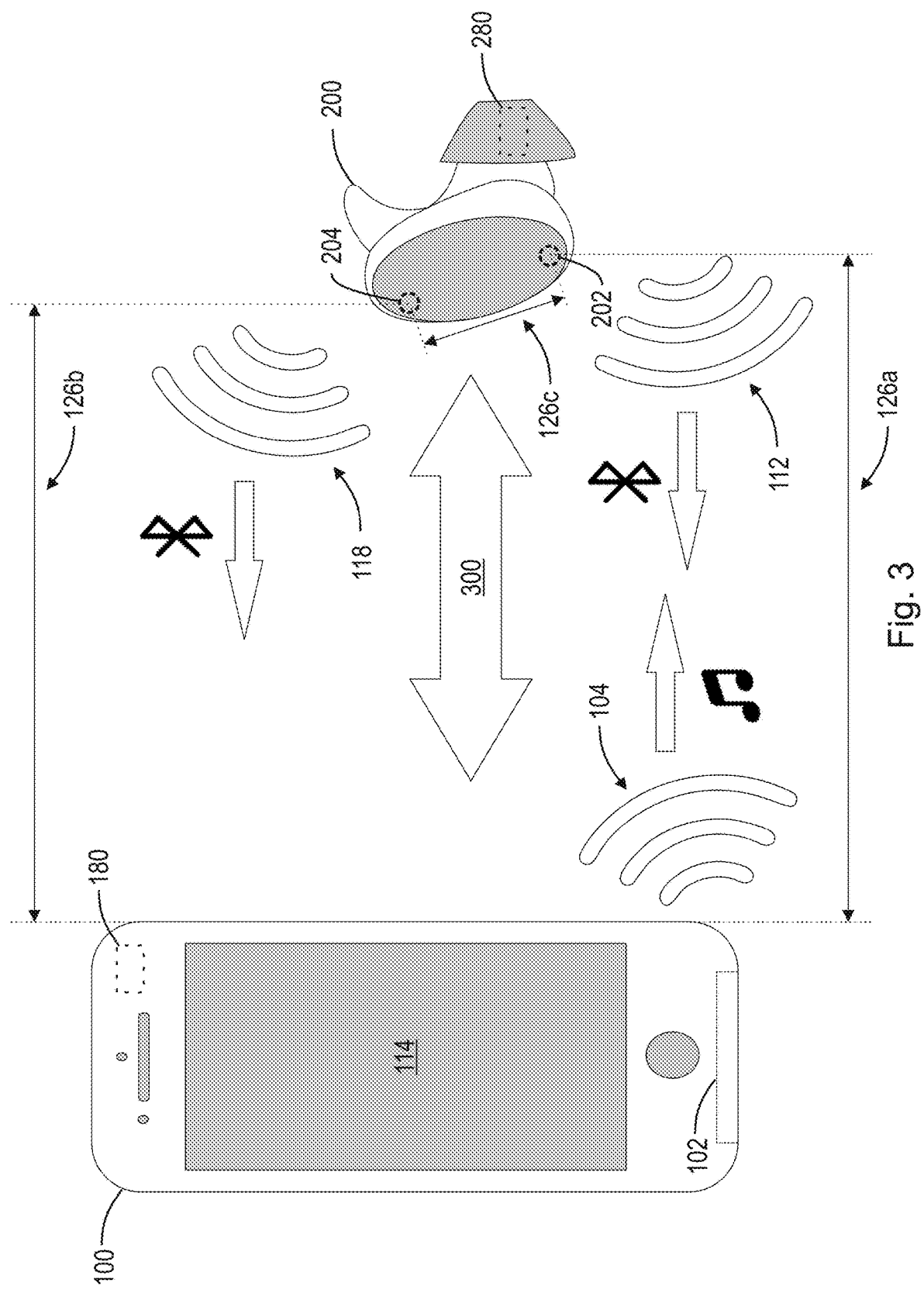
FIG. 3 is a third audio and data transmission diagram of a locating device and an audio apparatus, according to an example.

According to an example, and as shown in FIG. 3, the computer readable instructions of the locating device 100 are further arranged to determine a time delay 116 corresponding to a second microphone 204 of audio apparatus 200. Calculating a second microphone time delay 116, along with the time delay 106 corresponding to the first microphone 202 provides the processor 175 with sufficient information to determine the distance 126a to the first microphone 202 and the distance 126b to the second microphone 204. Determining these two distances 126a, 126b allows the processor 175 to determine additional information related to location 108 regarding the audio apparatus 200, such as the orientation of the audio apparatus 200. Determining the orientation of the audio apparatus 200 can require the locating device 100 to receive and/or store additional information, such as the type of the audio apparatus 200 (earbud, headset, etc.), as well as the distance 126c between the first 202 and second 204 microphones.

Figure 4:
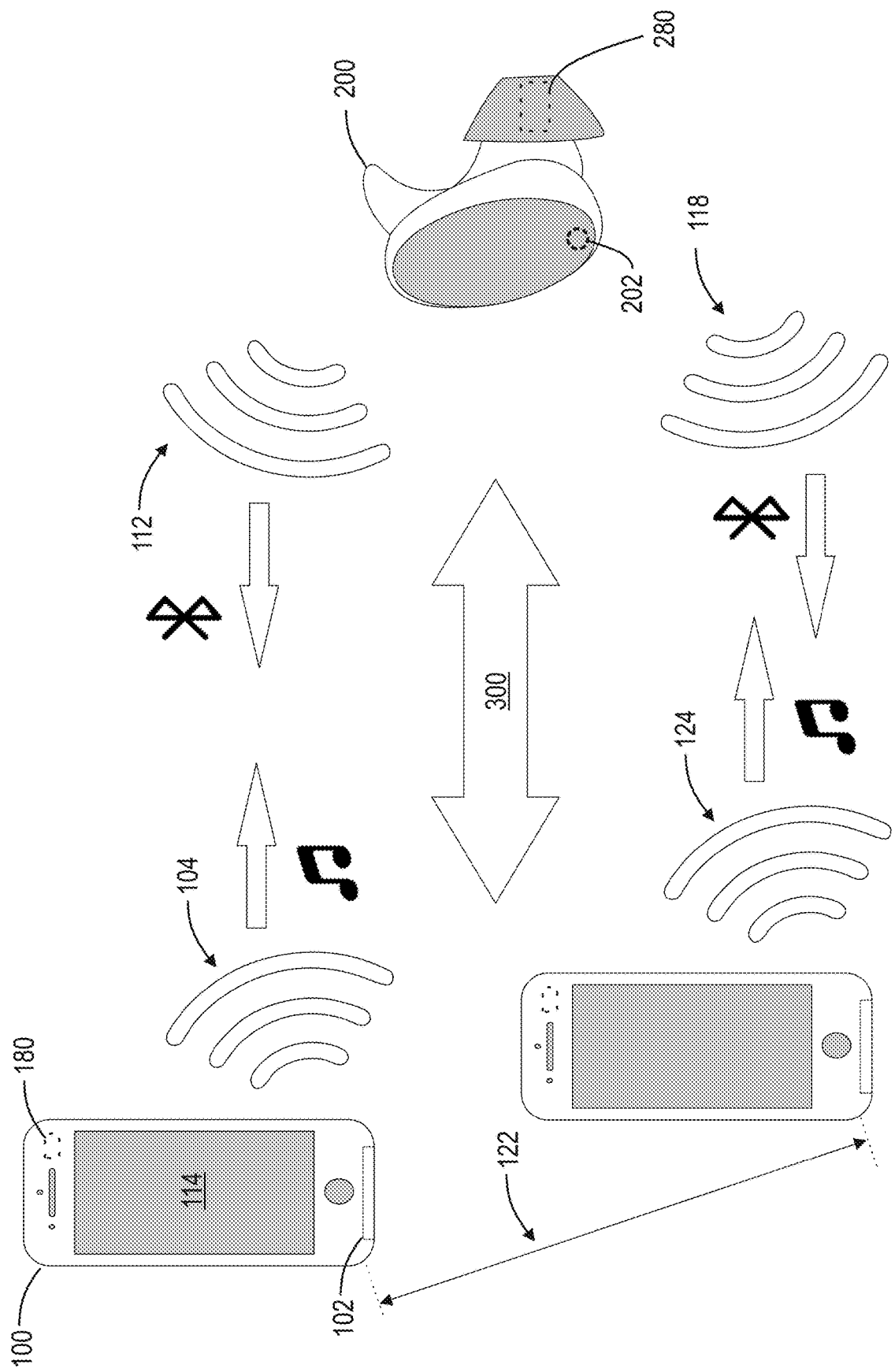
FIG. 4 is a fourth signal transmission diagram of a locating device and an audio apparatus, according to an example.

According to an example, and as shown in FIG. 4, the computer readable instructions of the locating device 100 are further arranged to determine multiple time delays corresponding to moving the locating device 100 to different location by a relocation distance 122. The relocation distance 122 can be tracked by various components of the locating device 100, such as micro-electromechanical sensors (MEMS) or Global Positioning System (GPS) sensors.

Determining multiple time delays, as well as tracking the relocation distance 122 at each stage allows for the processor 175 of the locating device 100 to determine if the distance 126 between the locating device 100 and the audio apparatus 200 is increasing or decreasing, as well as the direction and/or angle of the audio apparatus 200 relative to the locating device 100. The increasing or decreasing distance 126 can be translated into a location progress indicator 132 which tracks whether the locating device 100 is getting closer to or farther away from the audio apparatus 200.

In this example, a first time delay 106 and distance 126 is determined based on the previously described steps. The locating device 100 is then moved by a relocation distance 122. The locating device 100 then plays second audio 124a via the audio transducer 102. The microphone 202 of the audio apparatus 200 records the second audio 124b. The audio apparatus 200 then transmits, via the Bluetooth connection 300, second data 118 including the second audio 124b to the locating device 100. The locating device 100 then determines a second signal time delay 134 based on when the locating device 100 played the second audio 124a, and when the locating device 100 received the second data 118 using a similar calculation as described above. The locating device 100 can then determine the updated distance 126 as well as various aspects of the location 108 based on the second signal time delay 134 as well as the relocation distance 122.

In one example, Bluetooth connection 300 between the audio apparatus 200 and the locating device 100 can be a Bluetooth Classic connection, rather than an LE Audio connection. Bluetooth Classic lacks the known latency constant 136 of LE Audio, thus making precise distance calculations based on a single time delay 106 measurement difficult. However, Bluetooth Classic can be used in the iterative time delay 106, 134 measurement process to determine if the locating device 100 is moving closer to or farther from the audio apparatus 200 relative to its previous position.

According to a further example, the audio apparatus 200 can be a soundbar or speaker component of a home audio system, such as a surround sound system. In this example, precise determination of distance 126 and location 108 can be utilized to determine optimum soundbar placement and/or orientation in a home listening environment.

According to a further example, the audio apparatus 200 can be a component of a professional audio system, such as a line array. In this example, precise determination of location 108 can be utilized to determine optimum placement and/or orientation in a public environment, such as a concert hall or a stadium.

According to a further example, the distance 126 and/or location 108 determined by the locating device 100 or the audio apparatus 200 can be transmitted to an external device, such as a smartphone, personal computer, or network server, for collection, storage, and/or analysis. The external device can be configured to collect, store, and/or analyze location 108 for a plurality of audio apparatuses 200. In the case of a multicomponent speaker system, such as a professional audio system or home audio entertainment system, the external device can use distance 126 and/or location 108 of the individual components to determine optimum placement relative to the other components.

According to a further example, the Bluetooth connection 300 can be a BIS rather than a CIS connection. BIS allows for a single locating device 100 to transmit data 120 to multiple audio apparatuses 200, enabling the determination of distance 126 and/or location 108 for each of the multiple audio apparatuses 200. BIS can be particularly advantageous in a multi-component speaker arrangement, where each speaker component captures audio 104b generated by a single locating device 100 (such as a smartphone or another speaker component). If the locating device 100 is a first speaker component, the system can quickly determine the distance 126 of every other speaker component from the first speaker component. These distances 126 can be used to optimize speaker component arrangement.

Figure 7:
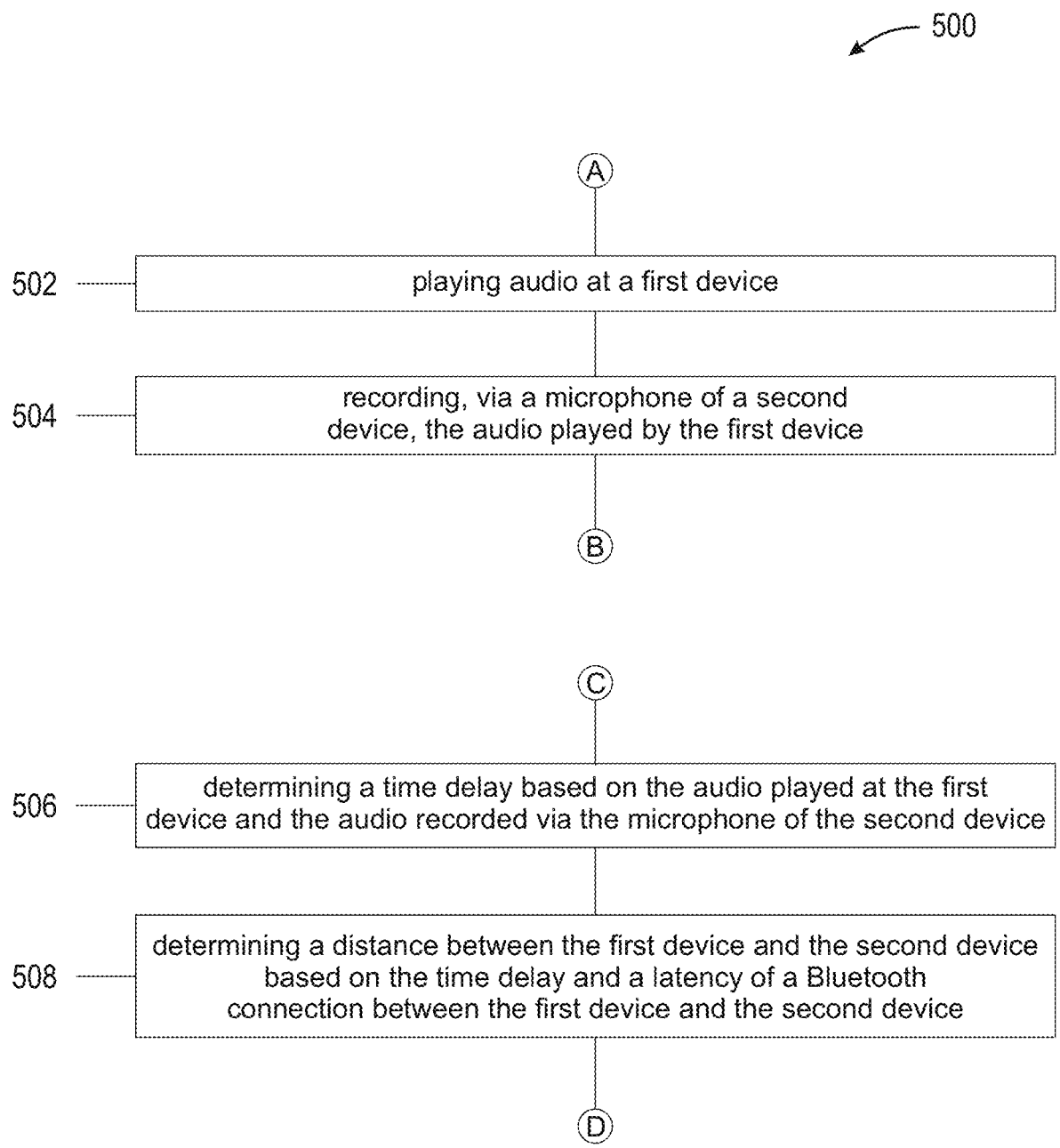
FIG. 7 is a flowchart of a method for determining distance between two devices, according to an example.

Generally, in another aspect, and with reference to FIG. 7, a method 500 for determining a distance between two devices is provided. The method 500 includes playing audio 502 at a first device. The method 500 further includes recording 504, via a microphone of a second device, the audio played by the first device. The method 500 further includes determining 506 a time delay based on the audio played at the first device and the audio recorded via the microphone of the second device. The method 500 further includes determining 508 a distance between the first device and the second device based on the time delay and a latency of a Bluetooth connection between the first device and the second device. According to an example, determining the distance between the first device and the second device comprises multiplying the difference of the time delay and the latency of the Bluetooth connection by the speed of sound.

Figure 8A:
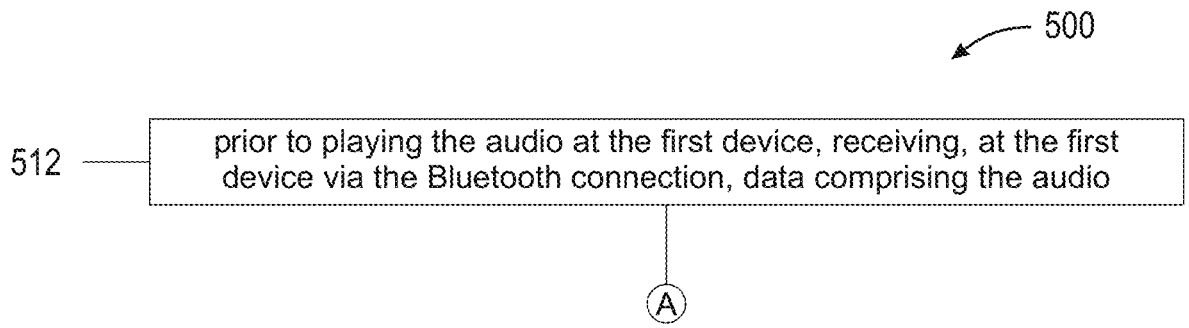
FIGS. 8A, 8B, and 8C are further flowcharts of a method for determining distance between two devices, according to an example.

According to an example, and with reference to FIG. 8A, the method 500 further includes, prior to playing the audio at the first device, receiving 512, at the first device via the Bluetooth connection, data comprising the audio.

Figure 8B:
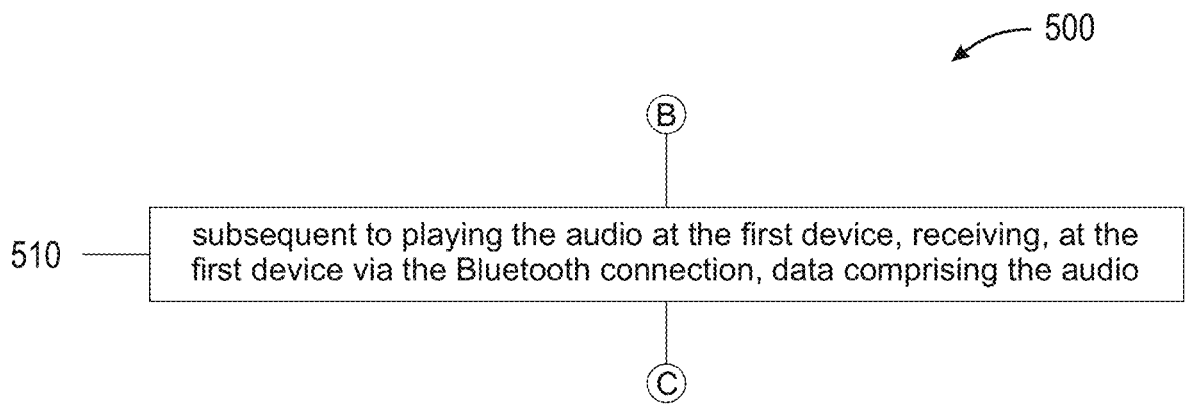

According to an example, and with reference to FIG. 8B, the method 500 further includes, subsequent to playing the audio at the first device, receiving 510, at the first device via the Bluetooth connection, data comprising the audio.

Figure 8C:
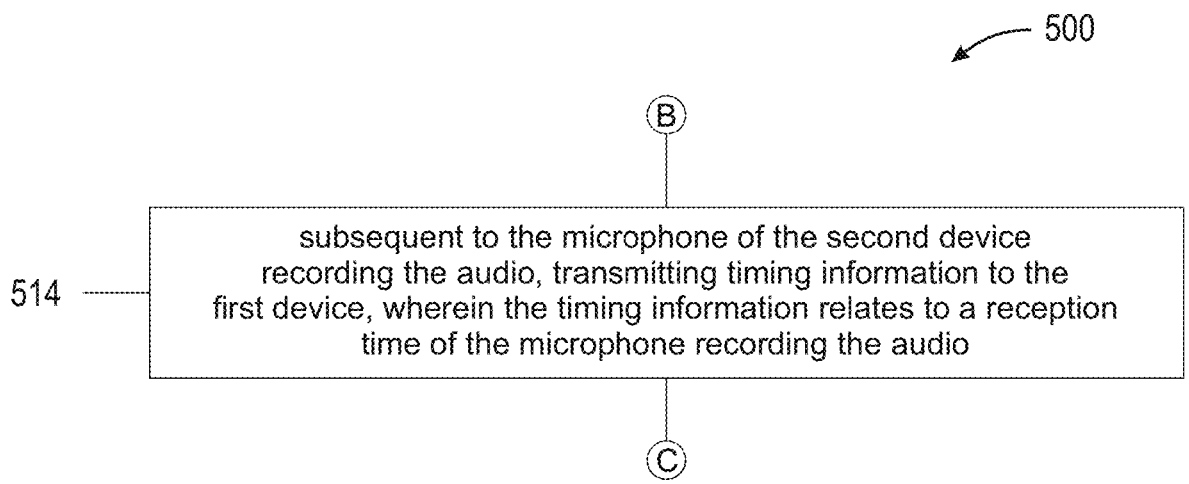

According to an example, and with reference to FIG. 8C, the method 500 further includes subsequent to the microphone of the second device recording the audio, transmitting 514 timing information to the first device. The timing information relates to a reception time of the microphone recording the audio. In this example, determining the time delay is further based on the timing information.

Figure 9A:
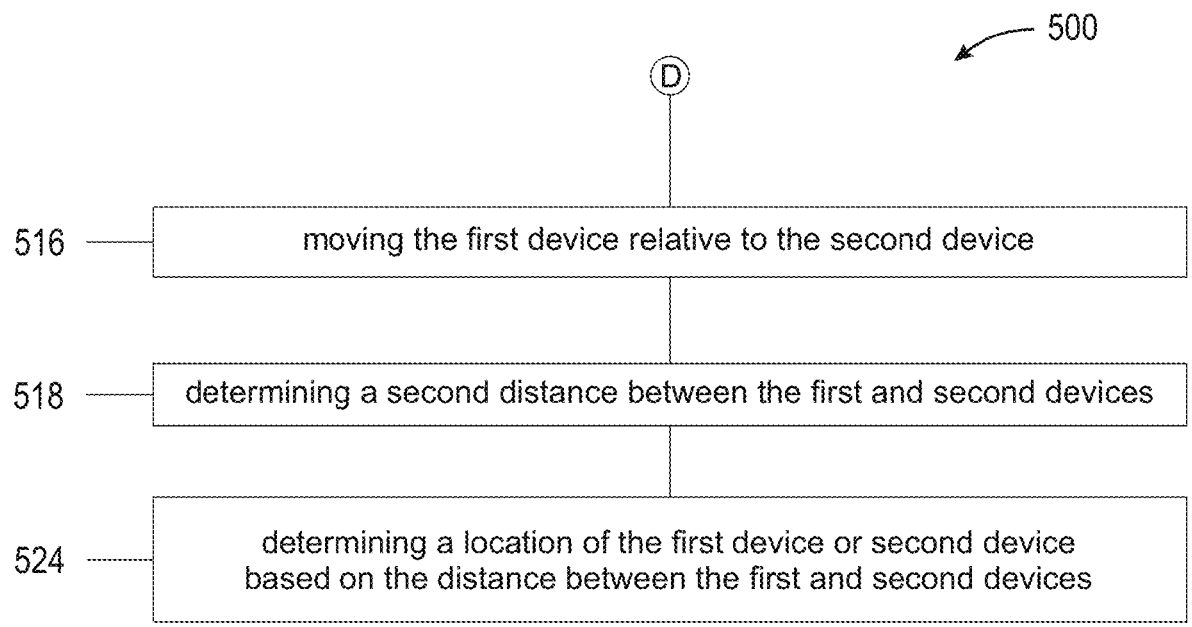
FIGS. 9A and 9B are further flowcharts of a method for determining distance between two devices, according to an example.
Figure 9B:
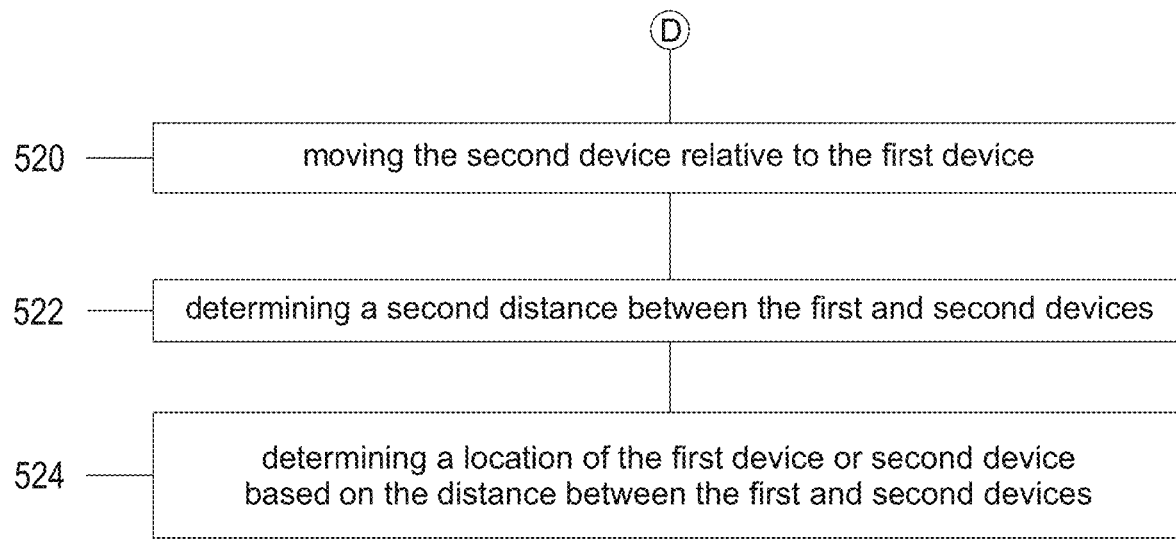

According to an example, the method 500 further includes determining 524 a location of the first device or second device based on the distance between the first and second devices. In one example, and with reference to FIG. 9A, determining the location of the first device further includes (1) moving 516 the first device relative to the second device and (2) determining 518 a second distance between the first and second devices. In an alternate example, and with reference to FIG. 9B, determining 524 the location of the first device further includes (1) moving 520 the second device relative to the first device and (2) determining 522 a second distance between the first and second devices. Determining the location of the first device or second device is further based on the second distance.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for determining a distance between two devices, comprising:
    playing audio at a first device via an acoustic transducer;
    recording, via a microphone of a second device, the audio played by the first device;
    subsequent to recording the audio played by the first device via the microphone of the second device, sending the audio recorded by the microphone of the second device to the first device via a Bluetooth connection;
    determining a time delay based on the audio played at the first device and the audio recorded via the microphone of the second device; and
    determining a distance between the first device and the second device based on the time delay and a latency constant of the Bluetooth connection between the first device and the second device, wherein the latency constant of the Bluetooth connection is a known latency constant associated with Bluetooth Low Energy Audio (LE Audio), and wherein determining the distance between the first device and the second device comprises multiplying the difference of the time delay and the latency constant of the Bluetooth connection by the speed of sound.

2. The method of claim 1, wherein the Bluetooth connection is a Broadcast Isochronous Stream.

3. The method of claim 1, further comprising, subsequent to the microphone of the second device recording the audio, transmitting timing information to the first device, wherein the timing information relates to a reception time of the microphone recording the audio.

4. The method of claim 3, wherein determining the time delay is further based on the timing information.

5. The method of claim 1, wherein the distance is determined by the first device.

6. The method of claim 1, wherein the Bluetooth connection is a Connected Isochronous Stream.

7. The method of claim 1, wherein the audio is played at ultrasonic frequencies.

8. The method of claim 1, further comprising determining a location of the first device based on the distance between the first and second devices.

9. The method of claim 8, wherein determining the location of the first device further comprises:
    moving the first device relative to the second device; and
    determining a second distance between the first and second devices;
    wherein determining the location of the first device is further based on the second distance.

10. The method of claim 8, wherein determining the location of the first device further comprises:
    moving the second device relative to the first device; and
    determining a second distance between the first and second devices;
    wherein determining the location of the first device is further based on the second distance.

11. The method of claim 1, further comprising determining a location of the second device based on the distance between the first and second devices.

12. The method of claim 11, wherein determining the location of the first device further comprises:
    moving the first device relative to the second device; and
    determining a second distance between the first and second devices;
    wherein determining the location of the first device is further based on the second distance.

13. The method of claim 11, wherein determining the location of the first device further comprises:
    moving the second device relative to the first device; and
    determining a second distance between the first and second devices;
    wherein determining the location of the first device is further based on the second distance.

14. A system for determining a distance between two devices, comprising:
    a first device configured to play audio via an acoustic transducer;
    a second device comprising a microphone, wherein the microphone is configured to record the audio played at the first device and send the audio recorded by the microphone of the second device to the first device via a Bluetooth connection; and a processor configured to:
- determine a time delay based on the audio played at the first device and the audio recorded via the microphone of the second device; and
- determining a distance between the first device and the second device based on the time delay and a latency constant of the Bluetooth connection between the first device and the second device, wherein the latency constant of the Bluetooth connection is a known latency constant associated with Bluetooth Low Energy Audio (LE Audio), and wherein determining the distance between the first device and the second device comprises multiplying the difference of the time delay and the latency constant of the Bluetooth connection by the speed of sound.

15. The system of claim 14, wherein the first device comprises the processor.

16. The system of claim 14, wherein the Bluetooth connection is a Connected Isochronous Stream.

17. The system of claim 14, wherein the first device is a smartphone or tablet computer.

18. The system of claim 14, wherein the second device is an earbud, hearing aid, audio headset, smart speaker, or set of audio eyeglasses.

19. The method of claim 1, wherein the known latency constant is less than or equal to 2 μs.

20. The system of claim 14, wherein the known latency constant is less than or equal to 2 μs.

* * * * *